US008260588B2

(12) United States Patent
Belgaied et al.

(10) Patent No.: US 8,260,588 B2
(45) Date of Patent: Sep. 4, 2012

(54) VIRTUALIZING COMPLEX NETWORK TOPOLOGIES

(75) Inventors: Kais Belgaied, Sunnyvale, CA (US); Sunay Tripathi, Palo Alto, CA (US); Nicolas G. Droux, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 372 days.

(21) Appl. No.: 12/580,386

(22) Filed: Oct. 16, 2009

(65) Prior Publication Data

US 2011/0093251 A1 Apr. 21, 2011

(51) Int. Cl.
*G06F 17/50* (2006.01)
*G06F 13/00* (2006.01)
*H04L 12/28* (2006.01)

(52) U.S. Cl. ............... 703/2; 703/14; 700/17; 709/239; 709/395; 370/395.5

(58) Field of Classification Search ............... 703/2, 14, 703/17; 709/239, 395; 700/17; 370/395.5
See application file for complete search history.

(56) References Cited

U.S. PATENT DOCUMENTS

| 6,041,053 A | 3/2000 | Douceur et al. |
| 6,070,219 A | 5/2000 | McAlpine et al. |
| 6,131,163 A | 10/2000 | Wiegel |
| 6,163,539 A | 12/2000 | Alexander et al. |
| 6,477,643 B1 | 11/2002 | Vorbach et al. |
| 6,600,721 B2 | 7/2003 | Edholm |
| 6,714,960 B1 | 3/2004 | Bitar et al. |
| 6,757,731 B1 | 6/2004 | Barnes et al. |
| 6,831,893 B1 | 12/2004 | Ben Nun et al. |
| 6,859,841 B2 | 2/2005 | Narad et al. |
| 6,944,168 B2 | 9/2005 | Paatela et al. |
| 7,046,665 B1 | 5/2006 | Walrand et al. |
| 7,146,431 B2 | 12/2006 | Hipp et al. |
| 7,177,311 B1 | 2/2007 | Hussain et al. |
| 7,260,102 B2 | 8/2007 | Mehrvar et al. |
| 7,313,142 B2 | 12/2007 | Matsuo et al. |
| 2002/0052972 A1 | 5/2002 | Yim |
| 2003/0037154 A1 | 2/2003 | Poggio et al. |
| 2004/0267866 A1 | 12/2004 | Carollo et al. |
| 2005/0111455 A1 | 5/2005 | Nozue et al. |
| 2005/0135243 A1 | 6/2005 | Lee et al. |
| 2005/0138620 A1 | 6/2005 | Lewites |
| 2006/0041667 A1 | 2/2006 | Ahn et al. |

(Continued)

OTHER PUBLICATIONS

Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001, (11 Pages).

(Continued)

*Primary Examiner* — Thai Phan
(74) *Attorney, Agent, or Firm* — Osha Liang LLP

(57) ABSTRACT

In general, the invention relates to a creating a network model on a host. The invention includes: gathering first component properties associated with a first physical network device on a target network; creating a first container using first component properties; determining that a second physical network device is operatively connected to the first physical network device via a physical network link; gathering second component properties associated with the physical network link; creating a first VNIC associated with the first container; determining that at least one virtual network device is executing on the second physical network device; gathering third component properties associated with the at least one virtual network device; creating a second container, wherein the second container is configured using the third component properties; and creating a second VNIC associated with the second container.

16 Claims, 6 Drawing Sheets

U.S. PATENT DOCUMENTS

| | | |
|---|---|---|
| 2006/0045089 A1 | 3/2006 | Bacher et al. |
| 2006/0070066 A1 | 3/2006 | Grobman |
| 2006/0174324 A1 | 8/2006 | Zur et al. |
| 2008/0002683 A1 | 1/2008 | Droux et al. |
| 2009/0150538 A1 | 6/2009 | Tripathi et al. |

OTHER PUBLICATIONS

Tripathi, S.; "Crossbow: Network Virtualization and Resource Control"; Presentation to Sun Labs Open House; Jun. 1, 2006; (22 pages).

Belgaied, K. et al.; "Crossbow Hardware Resources Management and Virtualization"; Sep. 28, 2007; 14 pages.

Droux, N.; "Crossbow Network Virtualization Architecture"; Aug. 28, 2007; Solaris Core OS, Sun Microsystems, Inc.; 51 pages.

Khare, S.; "VLANs as VNICs"; Solaris Networking, Sun Microsystems, Inc.; Aug. 13, 2007; 9 pages.

Tripathi, S.; "Data Path: Soft Ring Set (SRS) and Soft Rings for Dynamic Polling & Parallelization"; Jul. 23, 2007; 7 pages.

Droux, N.; "Virtual Switching in Solaris"; Solaris Networking, Sun Microsystems, Inc.; Apr. 2, 2007; 6 pages.

Tripathi, S.; "Crossbow Architectural Document"; Nov. 21, 2006; 19 pages.

Nordmark, E., et al.; "IP Instances Interface Document"; PSARC 2006/366; Dec. 28, 2006; 17 pages.

Nordmark, E.; "IP Instances Design Document"; PSARC 2006/366; Dec. 21, 2006; 38 pages.

Tripathi, S.; "Crossbow: Solaris Network Virtualization & Resource Control"; Aug. 23, 2006; 9 pages.

Droux, N.; "Crossbow: Network Virtualization and Bandwidth Partitioning"; presented at CHOSUG, Jun. 19, 2007; 23 pages.

Nordmark; E.; "IP Instances—Network Isolation Meets Zones"; presented at SVOSUG, Oct. 26, 2006; 28 pages.

Tripathi, S.; "CrossBow: Network Virtualization and Resource Control"; presented at SVOSUG, Aug. 24, 2006; 27 pages.

Tripathi, S.; "CrossBow: Network Virtualization and Resource Control"; presented at Sun Labs Open House; Jun. 1, 2006; 24 pages.

Tripathi, S.; "Solaris Networking—The Magic Revealed (Part I)"; Sunay Tripathi's Solaris Networking Weblog; Nov. 14, 2005; (22 Pages).

Sunay Tripathi, Nicolas Droux, Thirumalai Srinivasan, Kais Belgaied, "CrossBow: From Hardware Virtualized NICs to Virtualized Networks", Sun Microsystems, Inc., Sigcomm VISA 2009, Barcelona, Aug. 17, 2009, (24 Pages).

Sunay Tripathi, Nicolas Droux, Kais Belgaied, Shrikrishma Khare, "Crossbow Virtual Wire: Network in a Box", Solaris Kernal Networking, Sun Microsystems, Inc., 2009, (17 Pages).

VIRTUALIZING COMPLEX NETWORK TOPOLOGIES

BACKGROUND

Current computer networks may span vast physical distances and include an enormous array of network components. For large computer networks, thorough network tests are necessary before any major change is implemented which could adversely affect the network. It is often advantageous to create a virtual model of the network to test the change and therefore avoid interrupting user access to the network. The complexity of modern networks requires particularly accurate network modeling of all network components necessary for testing the network.

SUMMARY

In general, in one aspect, the invention relates to a computer readable medium comprising software instructions for creating a network model on a host, wherein the software instructions comprise functionality to: gather first component properties associated with a first physical network device on a target network; create, on the host, a first container, wherein the first container is configured using at least a portion of the first component properties; determine that a second physical network device is operatively connected to the first physical network device via a physical network link; gather, in response to the determination, second component properties associated with the physical network link; create, on the network host, a first virtual network interface card (VNIC) associated with the first container, wherein the first VNIC is configured using at least a portion of the second component properties; determine that at least one virtual network device is executing on the second physical network device; gather, in response to the determination, third component properties associated with the at least one virtual network device; create, on the host, a second container, wherein the second container is configured using at least a portion of the third component properties; and create, on the host, a second VNIC associated with the second container.

In general, in one aspect, the invention relates to a host comprising: a processor; a master console, when executed by the processor, is configured to: gather first component properties associated with a first physical network device of a plurality of network devices, wherein a target network comprises the plurality of physical network devices and a plurality of physical network links, wherein at least one virtual network device is executing on at least one of the plurality of physical network devices, and wherein the host is operatively connected to the target network; create, on the host, a first container, wherein the first container is configured using at least a portion of the first component properties; determine that a second physical network device is operatively connected to the first physical network device via a physical network link; gather, in response to the determination, second component properties associated with the physical network link; create, on the host, a first virtual network interface card (VNIC) associated with the first container, wherein the first VNIC is configured using at least a portion of the second component properties; determine that at least one virtual network device is executing on the second physical network device; gather, in response to the determination, third component properties associated with the at least one virtual network device; create, on the host, a second container, wherein the second container is configured using at least a portion of the third component properties; and create, on the host, a second VNIC associated with the second container.

DETAILED DESCRIPTION

Figure 1:
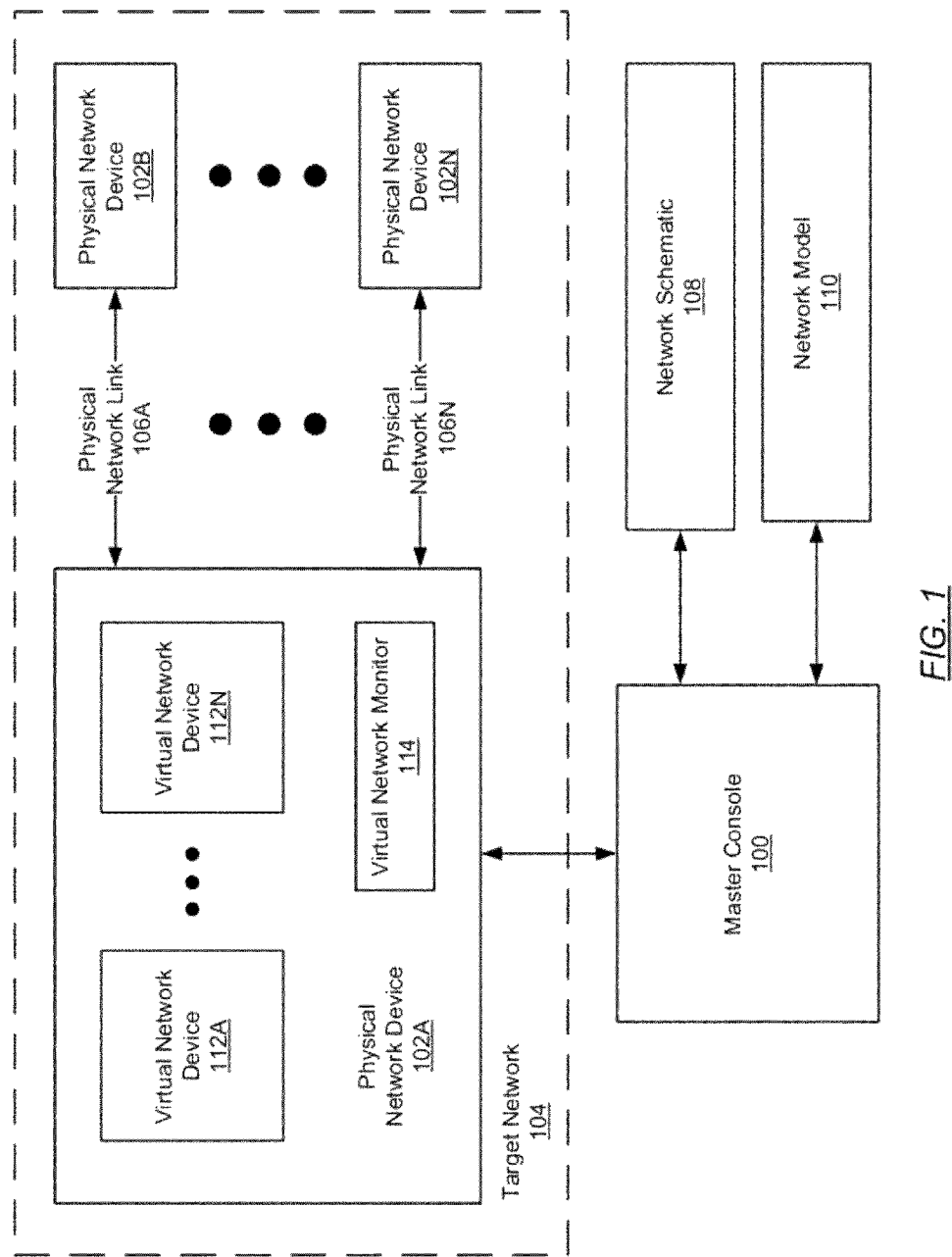
FIG. 1 shows a system in accordance with one or more embodiments of the invention.

Exemplary embodiments of the invention will be described with reference to the accompanying drawings. Like items in the drawings are shown with the same reference numbers.

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to creating a virtual representation of complex computer network topology including physical and virtual network devices. Events that could impact a network may be simulated and applied to the virtual representation of the network in order to test the impact of those events on the actual network. In addition, changes may be made to the virtual representation of the network to examine the potential consequences before those changes are deployed on the actual physical network.

FIG. 1 shows a system in accordance with one embodiment of the invention. As shown in FIG. 1, the system includes the Master Console (100) and a Target Network (104) comprising one ore more Physical Network Devices (102A, 102B, 102N). The system also includes a Network Schematic (108) and Network Model (110) associated with the Master Console (100). Each Physical Network Device (e.g., 102A, 102B, 102N) within the Target Network (104) is connected by one or more Physical Network Links (e.g. 106A, 106N).

For the purposes of this application, the term "physical" is used to distinguish from "virtual," and should not be read to exclude intangible network components. Specifically, the term "physical" is used to describe network components which are functionally tied to underlying hardware. "Virtual," as used in this application, refers to network components with functionally largely independent of underlying hardware. By way of example, physical network devices may include a router, a switch, or a server. Physical network links may include network connections over an 802.11g wireless local area network (LAN), satellite link, category 5 (CAT-5) cable, radio waves, fiber optic cable, etc. Virtual network devices may include virtual network interfaces, virtual switches, and virtual machines. Virtual network links may include virtual wires or other network connection between two virtual network devices. Embodiments of virtual wires are described in U.S. patent application Ser. No. 11/953,842 entitled "Method and System for Monitoring Virtual Wires," which is hereby incorporated by reference in its entirety. Embodiments of virtual switches are described in U.S. patent application Ser. No. 11/480,261 entitled "Virtual Switch," which is hereby incorporated by reference in its entirety.

In one embodiment of the invention, each Physical Network Device (102A, 102B, 102N) may correspond to any physical device connected to a network and configured to communicate over that network (e.g., a router, firewall, switch, server, bridge, etc.). More specifically, in one embodiment of the invention, one or more Physical Network Devices (e.g. 102A, 102B, 102N) may correspond to a device configured to direct network traffic, including devices that operate at the data link and network layers of the OSI Reference Model (e.g., switch, router, etc.). One or more Physical Network Devices (e.g., 102A, 102B, 102N) may correspond to a device configured to send and receive network traffic, including devices that operate at the transport, session, presentation, and application layers of the Open System Interconnection (OSI) Reference Model. (e.g. webserver, workstation, database, etc.).

In one embodiment of the invention, each Physical Network Link (106A, 106N) may correspond to any network connection between two Physical Network Devices (e.g., 102A, 102B, 102N). In one embodiment of the invention, one or more Physical Network Links (e.g., 106A, 106N) correspond to a network connection over a local area network. In one embodiment of the invention, one or more Physical Network Links (e.g., 106A, 106N) correspond to a network connection over a wide area network (e.g., the Internet). In one embodiment of the invention, one or more Physical Network Links (e.g., 106A, 106N) include one or more network communication ports residing on a Physical Network Device (102A, 102B, 102N).

In one embodiment of the invention, one or more Physical Network Devices (e.g., 102A, 102B, 102N) may include one or more Virtual Network Devices (e.g., 112A, 112N). In one embodiment of the invention, each Virtual Network Device (e.g., 112A, 112N) includes functionality similar to that of a Physical Network Device. Examples of such Virtual Network Devices (e.g., 112A, 112N) include virtual network interface cards (VNICs), Virtual Switches, containers, and virtual machines (VMs). In one embodiment of the invention, one or more Virtual Network Devices (e.g., 112A, 112N) includes functionality that does not correspond to the functionality of a Physical Network Device. In one embodiment of the invention, one or more Physical Network Devices (e.g., 102A, 102B, 102N) do not include Virtual Network Devices or Virtual Network Links. In one embodiment of the invention, a Physical Network Device (e.g., 102A) which includes one or more Virtual Networking Devices (112A, 112B) may be referred to as a Host.

In one embodiment of the invention, a Host Operating System (OS) (not shown) executing on a Physical Network Device (e.g., 102A, 102B, 102N) is configured to provide functionality to create virtual execution environments (e.g., VMs) (104A, 104N). Further, the Host OS may include functionality to manage the aforementioned virtual environments. The virtual environments may be provided using well known techniques in the art. An example of virtual execution environment is a Solaris™ Container. In such cases, the Solaris™ Container may execute in the Host OS, which may be a Solaris™ OS. Solaris™ is a trademark of Sun Microsystems, Inc. A "container" (also referred to as "zones") used herein refers to an isolated software execution environment located within a single operating system instance. In other words, each container does not include its own operating system instance, but rather uses the same operating system instance as the Host. Those skilled in the art will appreciate that other virtualization technologies such as VMware® Server (VMware® a registered trademark of VMware, Inc.) and Xen® (Xen® is a trademark overseen by the Xen Project Advisory Board) may also be used to provide virtual execution environments. In such cases, the virtual environments are virtual machines.

In one embodiment of the invention, the virtual machines may include functionality to execute an operating system (e.g., a guest OS). In one embodiment of the invention, each virtual execution environment (which may be a container or virtual machine) may be isolated such that processes within a virtual execution environment cannot communicate with other processes in other virtual execution environments. In addition, each virtual execution environment may be associated with a portion of the total hardware and processing resources of the host. In one embodiment of the invention, the Host OS may include the functionality to send messages to, and receive messages from, elements within each of the virtual execution environments. In one embodiment of the invention, Virtual Network Devices (e.g., 112A, 112N) may include virtual execution environments (e.g., VMs) executing software configured to communicate over the Target Network (104).

In one embodiment of the invention, VNICs provide an abstraction layer between the Virtual Network Devices (112A, 112N) and the Host OS. Each VNIC may be associated with one or more MAC addresses, one or more Internet Protocol (IP) addresses, one or more ports, and configured to handle one or more protocol types. In one embodiment of the invention, each VNIC is functionally similar to a physical network interface card, and each VNIC interacts with other Virtual Network Devices (e.g., 112A, 112N) as though it were a physical network interface card. In one embodiment of the invention, the VNICs are located in the Media Access Control (MAC) layer of the physical network device upon which they are executing.

In one embodiment of the invention, a Virtual Switch may correspond to a mechanism to create a virtual network within a host, where the virtual network includes two or more VMs (or other virtual execution environments) operatively connected to the Virtual Switch. In one embodiment of the invention, the Virtual Switch restricts communication within the Host such that only VMs (or other virtual execution environments) operatively connected to the Virtual Switch may communicate with each other. Said another way, a VM is not able to communicate with another VM (or other virtual execution environment) on the Host unless the other VM (or other virtual execution environment) is connected to the same Virtual Switch. In addition, two or more virtual networks created using Virtual Switches and executing on the same host may be isolated from one another such that network traffic from a first virtual network will not reach or otherwise impact any other virtual network that is not connected to the first virtual network.

Each Virtual Network Device (e.g. 112A, 112B) may be connected to another Virtual Network Device (e.g. 112A, 112N) using Virtual Network Links (not shown). One or more Virtual Network Links (not shown) may be functionally similar to a Physical Network Link. For example, in one embodiment of the invention, a first VM may be connected to a Virtual Switch via a Virtual Network Link in a functionally similar manner that a physical computer system is connected to a physical network switch via a physical network link.

Continuing with the discussion of FIG. 1, in one embodiment of the invention, the Master Console (100) is configured to traverse the Target Network (104) to gather the Component Properties of each Network Component (e.g., Physical Network Devices, Physical Network Links, Virtual Network Devices, and Virtual Network Links). In one embodiment of the invention, the Component Properties correspond to the characteristics of each Network Component (e.g., Physical Network Devices (102A, 102B, 102N), Physical Network Links (106A, 106N) Virtual Network Devices (112A, 112N), and Virtual Network Links (not shown)). In one embodiment of the invention, Component Properties associated with a Physical or Virtual Network Device may include function, speed, physical location, network address, active network connections, etc. In one embodiment of the invention, Component Properties associated with a Physical or Virtual Network Link may include connection speed, port number, distance, connection media, connection protocol, historical reliability, drop rate, the VLAN ID, Maximum Transmit Unit size, traffic priority, etc. In one embodiment of the invention, the Master Console (100) gathers Component Properties of each Physical Network Device, Physical Network Link, Virtual Network Device, and Virtual Network Link (collectively referred to as "Network Components") within the Target Network (104).

In one embodiment of the invention, one or more Physical Network Devices (e.g., 102A, 102B, 102N) may include a Virtual Network Monitor (114). In one embodiment of the invention, the Virtual Network Monitor (114) is a process or group of process executing within the Host OS which includes functionality to gather the Component Properties of the Virtual Network Devices (e.g., 112A, 112N) and Virtual Network Links (not shown) executing on the Physical Network Device (102A). In one embodiment of the invention, the Virtual Network Monitor (114) includes functionality to respond to queries issued by the Master Console (100) regarding the Component Properties of the Virtual Network Devices (112A, 112N) and Virtual Network Links (not shown). In one embodiment of the invention, the Virtual Network Monitor (114) corresponds to a process with sufficient access privileges to gather the Component Properties of each Virtual Network Device (e.g., 112A, 112N) and Virtual Network Link (not shown) executing on the Physical Network Device (102A). The Virtual Network Monitor (114) may provide an interface enabling the Master Console (100) to access the VMs or other Virtual Network Devices (e.g., 112A, 112N) on the Physical Network Device (e.g., 102A).

In one embodiment of the invention, the Master Console (100) communicates with the Virtual Network Monitor (114) to gather the Component Properties of each Virtual Network Device (e.g., 112A, 112N) and Virtual Network Link (not shown) executing on a Physical Network Devices (102A, 102B, 102N). In one embodiment of the invention, the Master Console (100) corresponds to a combination of hardware and software associated with a Physical Network Device operatively connected (e.g., by a wired or wireless network connection) to the Target Network (104). In an alternate embodiment of the invention, the Master Console (100) corresponds to a set of software instructions executing on one or more Physical or Virtual Network Devices within the Target Network (104).

In one embodiment of the invention, the Component Properties gathered by the Master Console (100) are stored in the Network Schematic (108). In one embodiment of the invention, the Network Schematic (108) includes data related to the topology of the Target Network (104). Said another way, the Network Schematic (108) may include information about each Network Component and the corresponding Component Properties sufficient to describe, for example, the configuration, functionality, location, and speed of each Network Component within the Target Network (104). In one embodiment of the invention, the Network Schematic (108) corresponds to a representation of the Network Components and associated Component Properties gathered by the Master Console (100). In one embodiment of the invention, the Network Schematic (108) is stored on a device (or a number of devices operatively connected to (or within) the Master Console (100).

In one embodiment of the invention, the Master Console (100) uses the Component Properties stored in the Network Schematic (108) to create the Network Model (110). Specifically, in one embodiment of the invention, the Master Console (100) creates a Virtual Network Device for each Network Device described in the Network Schematic (108), and a Virtual Network Link for each Network Link described in the Network Schematic (108).

In one embodiment of the invention, the Network Model (110) corresponds to a group of Virtual Network Devices and Virtual Network Links configured to simulate network communications across a Target Network (e.g., 104). Network Model (110) may be executing on a single host computing system including one or more operating systems. Alternatively, Network Model (110) may be executing on multiple host computing systems, each with one or more instances of an operating system. In one embodiment of the invention, one or more Virtual Network Devices within Network Model (110) may be operatively connected to Physical Network Devices (e.g., 102A, 102B, 102N) of Target Network (104).

In one embodiment of the invention, the Master Console (100) creates and configures a Virtual Switch on the Network Model (110) for each physical or virtual switch encountered within the Target Network (104). Each Virtual Switch created by the Master Console (100) may be configured to send and receive data in a manner which is functionally similar to the physical or virtual switch within the Target Network (104). In one embodiment of the invention, each Virtual Switch is configured using the Component Properties of the corresponding Network Device.

In one embodiment of the invention, the Master Console (100) creates a container for each Network Device (physical or virtual), and configures the container with the Component Properties of the Network Device.

In one embodiment of the Invention, the Master Console (100) creates two VNICs for each Network Link (Physical and Virtual), and configures each VNIC to simulate the functionality of the Network Link using the Component Properties of the Network Link. In one embodiment of the invention, each VNIC is configured by the Master Console (100) to send and receive network traffic at the same rate as the its corresponding Network Link. Each VNIC may be configured to facilitate communication between containers created by the Master Console (100) or between containers and Virtual Switches.

In one embodiment of the invention, if the Master Console (100) has encountered two Physical Network Devices connected over a Wide Area Network (WAN) (e.g., the Internet) the Master Console (100) may creates a container to simulate the network conditions of that WAN connection. For example, a WAN container created by the Master Console (100) may intercept and delete packets at a rate similar to the measured packet drop rate over the WAN connection.

In one embodiment of the invention, the Virtual Switches, Containers, and VNICs are created using an Etherstub Data Link (not shown). An Etherstub Data Link includes functionality to communicate with the Master Console (100), and may be used instead of a physical NIC to create VNICs. More specifically, the Etherstub Data Link is a named entity which includes functionality to receive instructions from the Master Console (100) to create and configure Virtual Network Devices and Virtual Network Links (e.g., Virtual Switches, Containers, VNICs, etc.) within the Network Model (110). VNICs created on an Etherstub will appear to be connected through a virtual switch. In one embodiment of the invention, using an Etherstub to create Virtual Network Devices and Virtual Network Links allows complete virtual networks to be built without physical hardware.

In one embodiment of the invention, the Master Console (100) creates each Virtual Network Device and Virtual Network Link in the Network Model (110) after each element of the Target Network (104) is recorded in the Network Schematic (108). In one embodiment of the invention, each Virtual Network Device and Virtual Network Link is created on the Network Model (110) as each element on the Target Network (104) is detected. In one embodiment of the invention, the Master Console (100) creates the Network Model (110) without using the Network Schematic (108) to store or retrieve the Component Properties.

In one embodiment of the invention, the Master Console (100) may issue queries to the Network Model (110) in order to ascertain potential effects of changes made to the Target Network (104) before those changes are deployed. In one embodiment of the invention, the Network Model (110) may be reconfigured and tested by the Master Console (100) to determine potential advantages and disadvantages of changes made to the Target Network (104).

Figure 2:
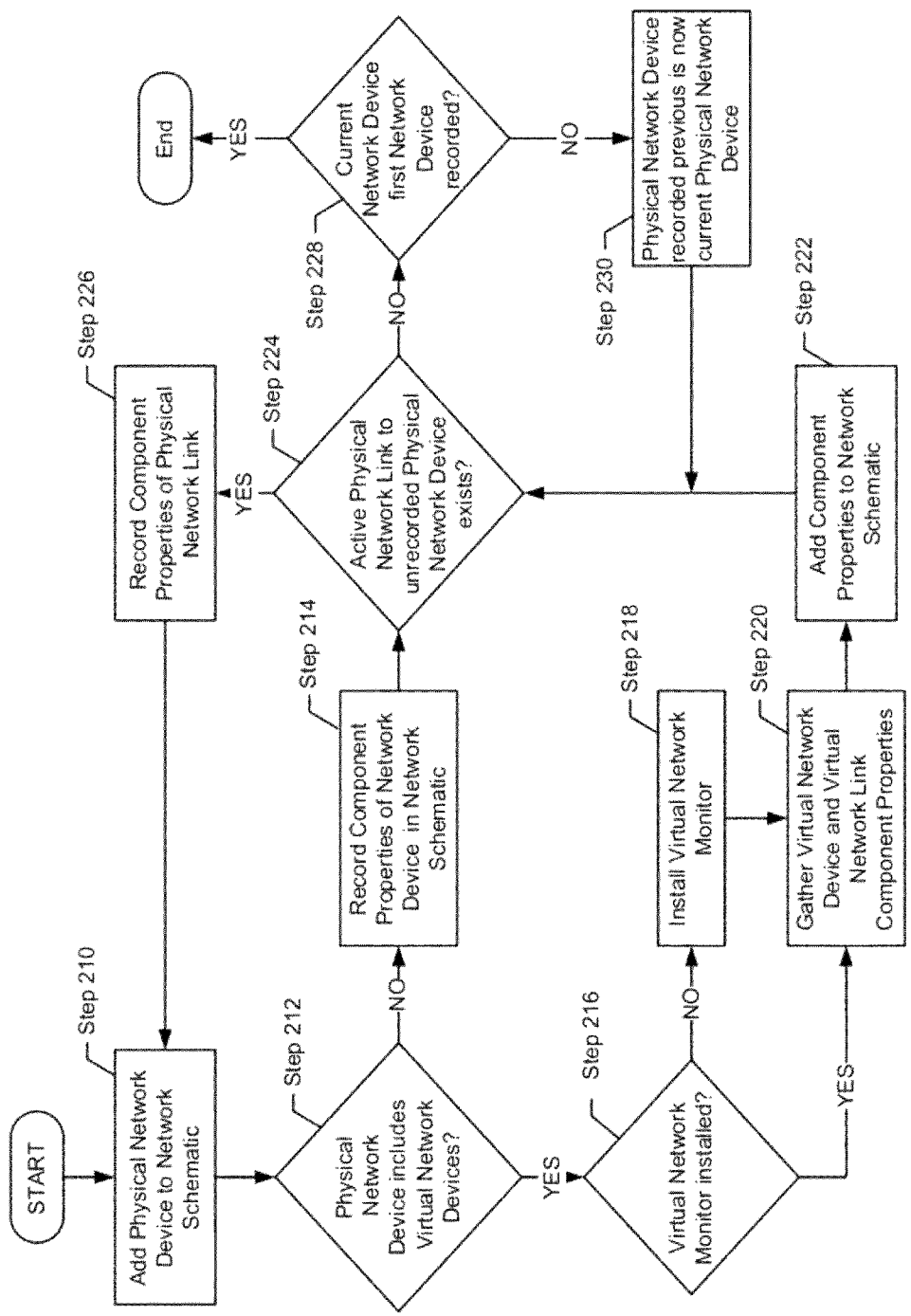
FIG. 2 shows a flowchart in accordance with one or more embodiments of the invention.

FIG. 2 shows a flow chart for gathering the Component Properties of each Network Component on a Target Network in accordance with one or more embodiments of the invention. In one or more embodiments of the invention, one or more of the steps shown in FIG. 2 may be omitted, repeated, and/or performed in a different order than that shown in FIG. 2. Accordingly, the specific arrangement of steps shown in FIG. 2 should not be construed as limiting the scope of the invention.

In Step 210, the first Physical Network Device is added to the Network Schematic. In Step 212, a determination is made as to whether the Physical Network Device includes Virtual Network Components. If the Physical Network Device does not include Virtual Network Components, then in Step 214, the Component Properties of the Network Device are recorded in the Network Schematic. If the Physical Network Device includes Virtual Network Components, then in Step 216, a determination is made as to whether a Virtual Network Monitor is installed on the Physical Network Device. If no Virtual Network Monitor is installed, in Step 218, a Virtual Network Monitor is installed.

In Step 220, the Component Properties of the Virtual Network Devices and Virtual Network Links are collected. In one embodiment of the invention, the Component Properties include bandwidth constraints, priority, and assigned CPU resources. In Step 222, the Virtual Network Components and Component Properties are added to the Network Schematic. In Step 224, a determination is made as to whether an active Physical Network Link exists to a Physical Network Device not yet recorded in the Network Schematic. If an active Physical Network Link exists, then in Step 226, the Component Properties of the Physical Network Link are recorded in the Network Schematic, and the flow returns to Step 210.

If no active Physical Network Links exist to an unrecorded Physical Network Device, then in Step 228, a determination is made as to whether the current Physical Network Device was the first Physical Network Device recorded in the Network Schematic. If the current Physical Network Device was not the first Physical Network Device recorded, then in Step 230, the Physical Network Device recorded previous to the current Physical Network Device becomes the current Physical Network Device, and the flow returns to Step 224. If the current Physical Network Device was the first Physical Network Device recorded, then the flow ends.

Figure 3:
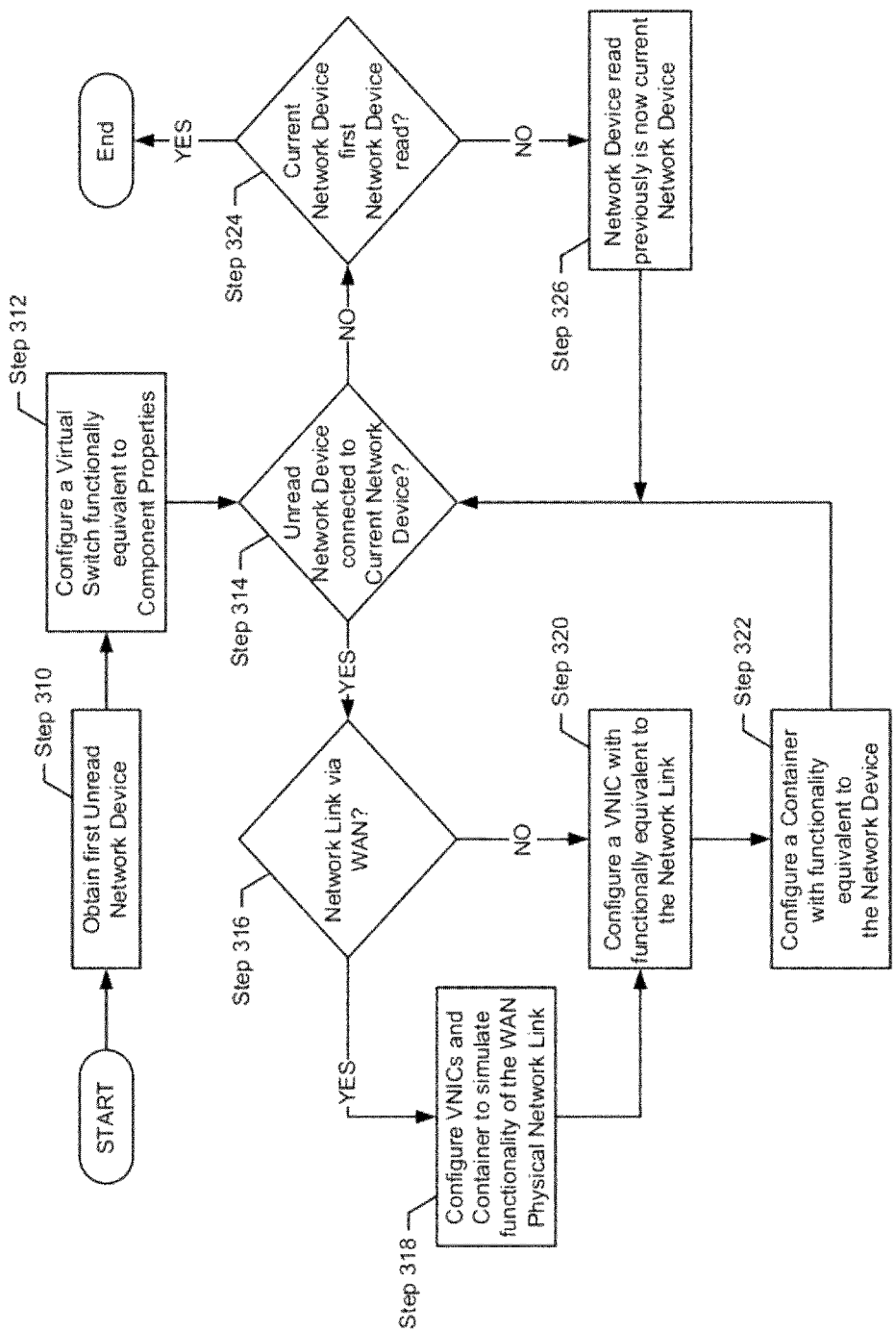
FIG. 3 shows a flowchart in accordance with one or more embodiments of the invention.

FIG. 3 shows a flow chart for initializing a virtual network stack in accordance with one or more embodiments of the invention. In one or more embodiments of the invention, one or more of the steps shown in FIG. 3 may be omitted, repeated, and/or performed in a different order than that shown in FIG. 3. Accordingly, the specific arrangement of steps shown in FIG. 3 should not be construed as limiting the scope of the invention.

In Step 310, the first unread Network Device is obtained. In Step 312, a virtual switch is configured with functionality equivalent to the Component Properties of the first unread Network Device. In Step 314, a determination is made as to whether an unread Network Device is connected to the current Network Device. If there is an unread Network Device connected to the current Network Device, then in Step 316, a determination is made as to whether the Network Device is connected via a Network Link over a WAN. If the Network device is connected via WAN, then, in Step 318, a Container and two VNICs are created and configured to simulate the WAN by incorporating the Component Properties of the Physical Network Device and Physical Network Links.

If the Network device is not connected via a WAN, then, in Step 320, two VNICs are created and configured with the Component Properties of the Network Link connecting the Network Device. In Step 322, a container is configured with the Component Properties of the Network Device, which is now the current Network Device. The flow then returns to Step 314.

If, in Step 314 there is no unread Network Device connected to the current Network Device, then in Step 324, a determination is made as to whether the current Network Device was the first Network Device read. If the current Network Device was not the first Network Device read, then in Step 326, the Network Device read previous to the current Network Device becomes the current Network Device, and the flow returns to Step 314. If, in Step 324, the current Network Device was the first Network Device read, then the flow ends.

Figure 4A:
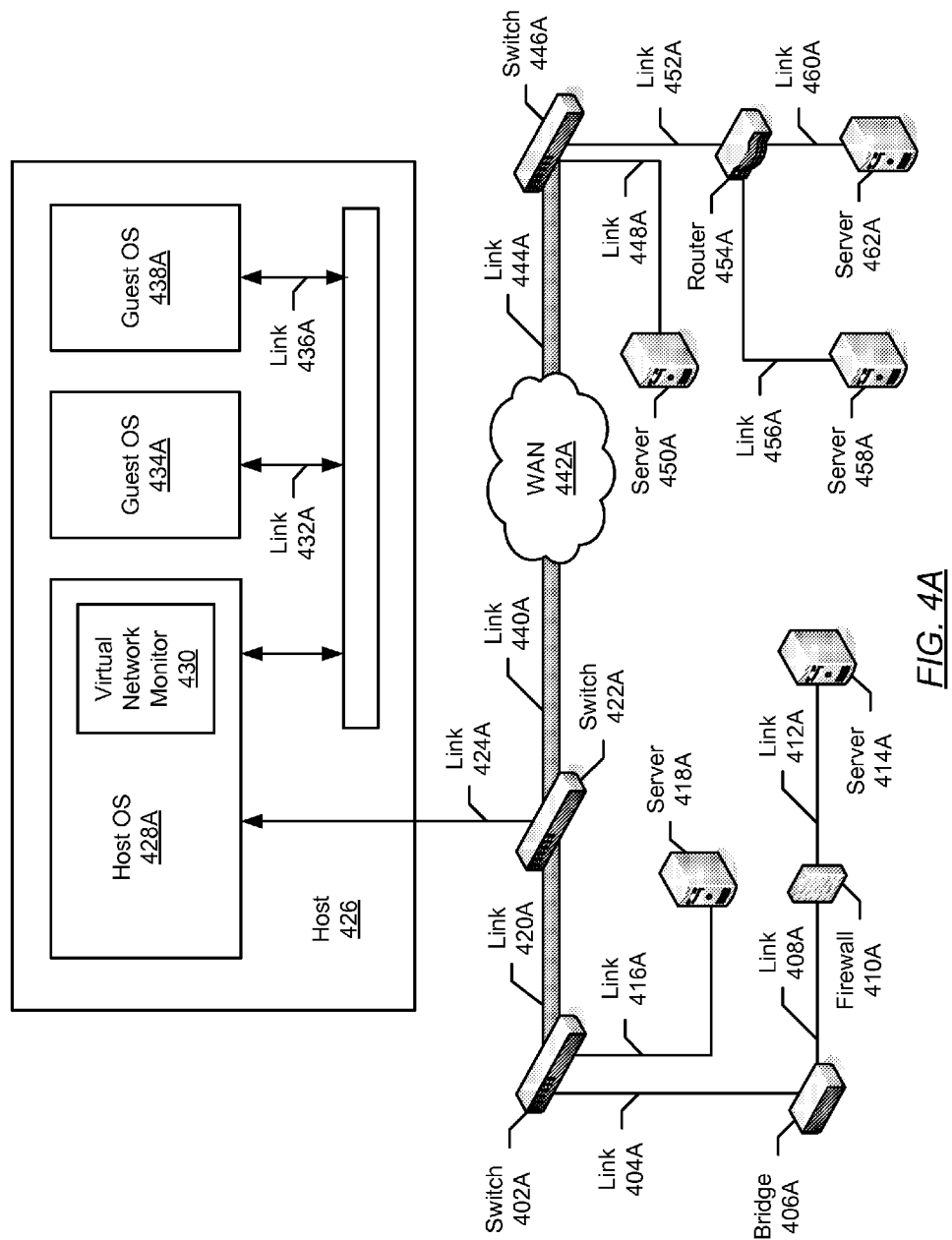
FIG. 4A shows an example in accordance with one or more embodiments of the invention.
Figure 4B:
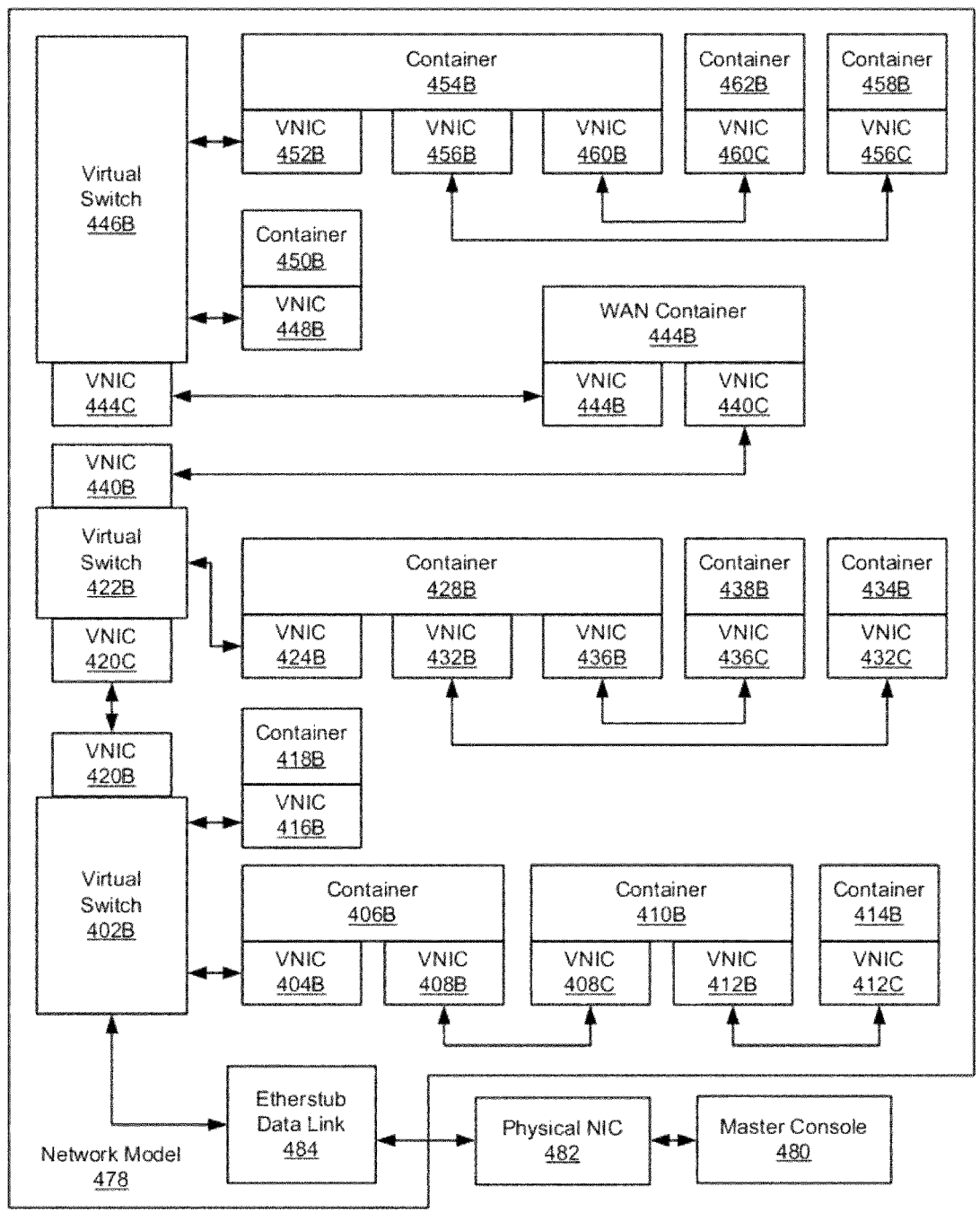
FIG. 4B shows an example in accordance with one or more embodiments of the invention.

FIGS. 4A and 4B show an exemplary target network and network model in accordance with one embodiment of the invention. The exemplary system is not intended to limit the scope of the invention. Further, some elements unnecessary for the purposes of the exemplary figure may have been omitted.

As depicted in FIG. 4A, the exemplary target network includes Switch 402A, which is connected to Bridge 406A via Link 404A. Bridge 406A is connected to Firewall 410A via Link 408A, and Firewall 410A is connected to Server 414A via Link 412A. Server 418A is also connected to Switch 402A via Link 416A.

Switch 402A is also connected to Switch 422A via Link 420A. Switch 422A is connected to Host 426 via Link 424A. Specifically, Switch 422A is connected to the Host OS 428A via Link 424A. Host 426 also includes Guest OS 434A and Guest OS 438A. Host OS 428A includes Virtual Network Monitor 430. Host OS 428A is connected to Guest OS 434A via Link 432A, and Guest OS 438A via Link 436A.

Switch 422A is also connected to Switch 446A, via Link 440A, WAN connection 442A, and Link 444A. Switch 446A is connected to Server 450A via Link 448A. Switch 446A is also connected to Router 454A via Link 452A. Router 454A is connected to Server 458A via Link 456A, and Server 462A via Link 460A.

For the purposes of the example, assume that the Master Console begins with Switch 402A. Starting with Switch 402A, the Master Console will build the Network Schematic according to the steps described in FIG. 2. First, Switch 402A is added to the Network Schematic. Because there are no Virtual Network Devices on Switch 402A, the Component Properties of Switch 402A are then added to the Network Schematic. Next, the first active link, Link 404A, to Bridge 406A is detected, and the Component Properties of Link 404A are recorded. The Master Console continues in this manner until it reaches Host 426.

When the Master Console reaches Host 426, it queries Virtual Network Monitor 430 to obtain the Component Properties of the Virtual Network Devices and Virtual Network Links executing on Host 426. This information is added to the Network Schematic.

Once the Master Console has recorded the Component Properties for each Network Device and Network Link in the Target Network, the Network Schematic contains information sufficient to create the entire Network Model. Alternatively, the Master Console may create the Network Model concurrently while traversing the Target network. In that case, each VNIC and Container is created as soon as the corresponding Network Device is recorded. Those skilled in the art will appreciate that there are other temporal configurations not enumerated here.

Exemplary FIG. 4B depicts a Network Model created by one embodiment of the invention. Specifically, the Network Model (478) depicted in FIG. 4B is generated by using a Network Schematic created according to the steps outlined in FIG. 2, from the exemplary network depicted in FIG. 4A.

Exemplary FIG. 4B includes the Master Console (480) connected to the Network Model (478) via a Physical Network Interface Card (NIC) (482). The Network Model (478) includes an Etherstub Data Link (484). The Etherstub Data Link (484) receives instructions from the Master Console (480) to create and configure each Virtual Network Device and Virtual Network Link (e.g., Virtual Switches, Containers, VNICs, etc.) from the information stored in the Network Model.

Once at least a portion of the Network Schematic is completed, the Master Console (480) uses the information contained therein to generate the elements of the Network Model (478) according to the Steps outlined in FIG. 3. The Master Console (480) instructs the Etherstub Data Link (484) to create Virtual Switch 402B and configure the Virtual Switch 402B with the Component Properties associated with Switch 402A and recorded in the Network Schematic. The Master Console (480) then instructs the Etherstub Data Link (484) to create Container 406B with the Component Properties of Bridge 406A, and create VNIC 404B configured with the Component Properties of Link 404A. A data link is then created from Virtual Switch 402B to Container 406B via VNIC 404B. Each Virtual Switch, Container, and VNIC is generated in this manner until each Network Component recorded by the Master Console (480) is read.

In general, embodiments of the invention related to virtualizing a network's full topology. Embodiments of the invention may be used to create a network model which provides a more comprehensive view of a target network. Further, embodiments of the invention may be used to create network models that accurately reflect the impact of distributed applications on a given topology. Model networks created with embodiments of the invention may factor in details of the topology such as bandwidth, tolerance to delays, tolerance to error rates, separation, priority, and CPU. Additionallly, model networks created with embodiments of the invention may be used to virtualize arbitrary topologies with multiple layers of routing, NAT'ing and firewalling.

Figure 5:
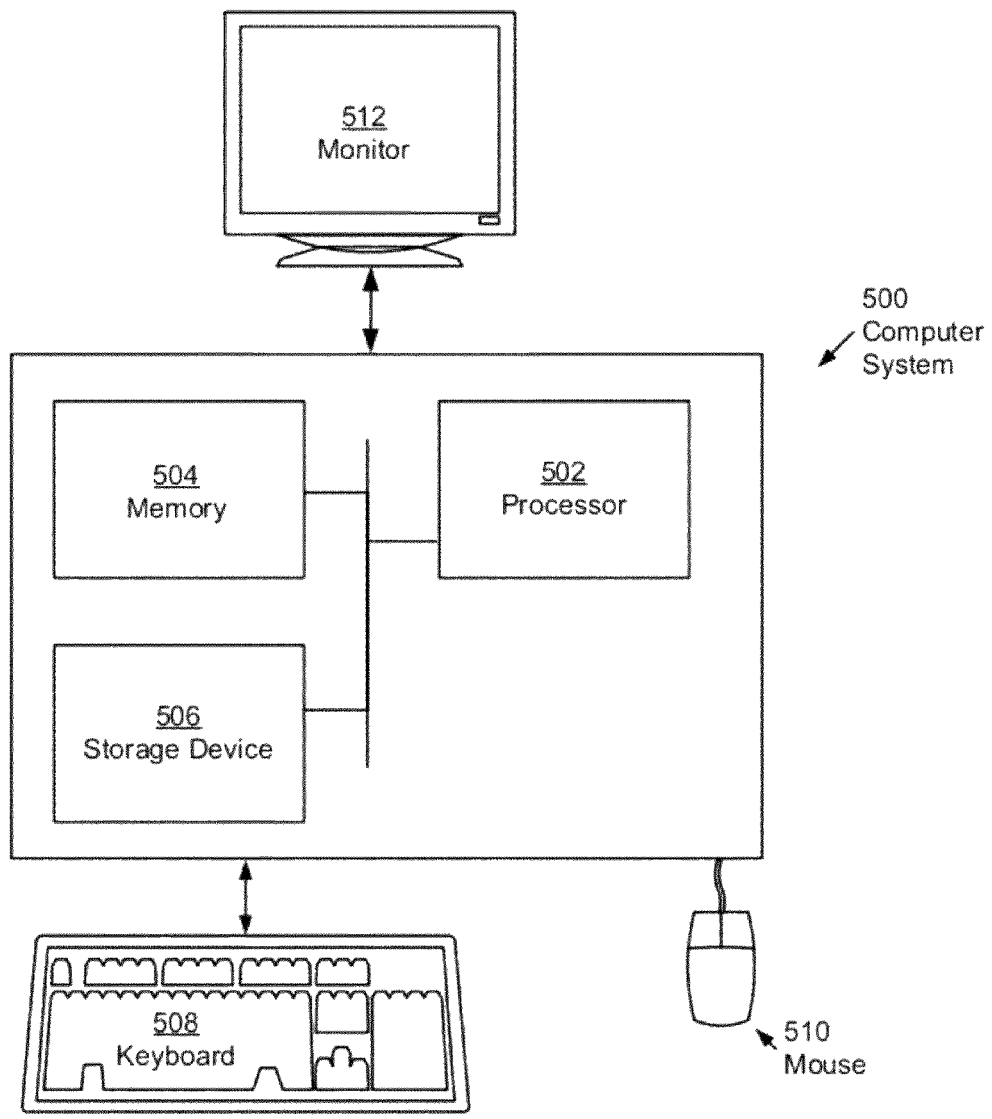
FIG. 5 shows a computer system in accordance with one or more embodiments of the invention.

An embodiment of the invention may be implemented on virtually any type of computer regardless of the platform being used. For example, as shown in FIG. 5, a networked computer system (500) includes a processor (502), associated memory (504), a storage device (506), and numerous other elements and functionalities typical of today's computers (not shown). The networked computer system (500) may also include input means, such as a keyboard (508) and a mouse (510), and output means, such as a monitor (512). The networked computer system (500) is connected to a local area network (LAN) or a wide area network via a network interface connection (not shown). Those skilled in the art will appreciate that these input and output means may take other forms. Further, those skilled in the art will appreciate that one or more elements of the aforementioned computer (500) may be remotely located and connected to the other elements over a network. Further, software instructions to perform embodiments of the invention may be stored on a computer readable medium such as a compact disc (CD), a diskette, a tape, or any other physical computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising software instructions for creating a network model on a host, wherein the software instructions comprise functionality to:
   gather first component properties associated with a first physical network device of a plurality of network devices, wherein a target network comprises the plurality of physical network devices and a plurality of physical network links wherein at least one virtual network device is executing on at least one of the plurality of physical network devices, and wherein the host is operatively connected to the target network;
   create, on the host, a first container, wherein the first container is configured using at least a portion of the first component properties, and wherein the first container is configured to simulate operation of the first physical network device in the network model;
   making a first determination that a second physical network device the plurality of physical network devices is operatively connected to the first physical network device over a Wide Area Network (WAN);
   gather, in response to the first determination, second component properties associated with the physical network link;
   create, on the host, a second container, wherein the second container is configured using at least a portion of the second component properties and wherein the second container simulates operation of the WAN in the network model;
   make a second determination that at least one virtual network device is executing on the second physical network device;
   gather, in response to the second determination, third component properties associated with the at least one virtual network device;
   create, on the host, a third container, wherein the third container is configured using at least a portion of the third component properties, and wherein the third container is configured to simulate the at least one virtual network device in the network model;

apply a change to the network model to obtain a modified network model;

simulate network communications on the modified network model; and deploy the change to the target network after simulating the network communication on the modified network model.

2. The non-transitory computer readable medium of claim 1, wherein the first container is operatively connected to a virtual switch on the host.

3. The non-transitory computer readable medium of claim 1, wherein the first component properties are stored in a network schematic.

4. The non-transitory computer readable medium of claim 1, wherein the third component properties are gathered by a virtual network monitor executing on the second physical network device.

5. The non-transitory computer readable medium of claim 1, wherein the first physical network device is one selected from a group consisting of a switch, a router, a bridge, a firewall, and a server.

6. The non-transitory computer readable medium of claim 1, wherein the third physical network device is one selected from a group consisting of a virtual machine, a virtual switch, a container, and a VNIC.

7. The non-transitory computer readable medium of claim 1, wherein the third component properties comprise connection speed, connection protocol, and bandwidth limit.

8. The non-transitory computer readable medium of claim 1, wherein the second component properties further comprise connection speed and packet delay rate.

9. A host comprising:
a processor;
a master console, when executed by the processor, is configured to:
gather first component properties associated with a first physical network device of a plurality of network devices, wherein a target network comprises the plurality of physical network devices and a plurality of physical network links, wherein at least one virtual network device is executing on at least one of the plurality of physical network devices, and wherein the host is operatively connected to the target network;
create, on the host, a first container, wherein the first container is configured using at least a portion of the first component properties, and wherein the first container is configured to simulate operation of the first physical network device in a network model;

making a first determination that a second physical network device the plurality of physical network devices is operatively connected to the first physical network device over a Wide Area Network (WAN);
gather, in response to the first determination, second component properties associated with the WAN, wherein the second component properties comprise a packet drop rate of the WAN;
create, on the host, a second container, wherein the second container is configured using at least a portion of the second component properties and wherein the second container simulates operation of the WAN in the network model;
make a second determination that at least one virtual network device is executing on the second physical network device;
gather, in response to the second determination, third component properties associated with the at least one virtual network device;
create, on the host, a third container, wherein the third container is configured using at least a portion of the third component properties, and wherein the third container is configured to simulate the at least one virtual network device in the network model;
apply a change to the network model to obtain a modified network model;
simulate network communications on the modified network model; and
deploy the change to the target network after simulating the network communication on the modified network model.

10. The host of claim 9, wherein the first container is operatively connected to a virtual switch on the host.

11. The host of claim 9, wherein the first component properties are stored in a network schematic.

12. The host of claim 9, wherein the third component properties are gathered by a virtual network monitor executing on the second physical network device.

13. The host of claim 9, wherein the first physical network device is one selected from a group consisting of a switch, a router, a bridge, a firewall, and a server.

14. The host of claim 9, wherein the third physical network device is one selected from a group consisting of a virtual machine, a virtual switch, a container, and a VNIC.

15. The host of claim 9, wherein the third component properties comprise connection speed, connection protocol, and bandwidth limit.

16. The host of claim 9, wherein the second component properties further comprise connection speed and packet delay rate.

* * * * *